June 16, 1964   E. H. BILLET   3,137,573
METHOD OF MAKING UP PRINTED MATTER
Original Filed Nov. 21, 1958   10 Sheets-Sheet 2

INVENTOR.
EDWARD HARRIS BILLET
BY Wallace, Kinzer and Dorn
ATTORNEYS

June 16, 1964 E. H. BILLET 3,137,573
METHOD OF MAKING UP PRINTED MATTER
Original Filed Nov. 21, 1958 10 Sheets-Sheet 5

FIG. 5

INVENTOR.
EDWARD HARRIS BILLET
BY Wallace, Kinger and Dorn
ATTORNEYS

June 16, 1964  E. H. BILLET  3,137,573
METHOD OF MAKING UP PRINTED MATTER
Original Filed Nov. 21, 1958  10 Sheets-Sheet 6

INVENTOR.
EDWARD HARRIS BILLET
BY Wallace, Kinger and Dorn
ATTORNEYS

June 16, 1964  E. H. BILLET  3,137,573
METHOD OF MAKING UP PRINTED MATTER
Original Filed Nov. 21, 1958  10 Sheets-Sheet 10

INVENTOR.
EDWARD HARRIS BILLET
BY Wallace, Kinzer and Dorn
ATTORNEYS

United States Patent Office 3,137,573
Patented June 16, 1964

3,137,573
METHOD OF MAKING UP PRINTED MATTER
Edward Harris Billet, Union, N.J., assignor to Varityper Corporation, Newark, N.J., a corporation of Delaware
Original application Nov. 21, 1958, Ser. No. 776,662, now Patent No. 2,968,992, dated Jan. 24, 1961. Divided and this application Oct. 31, 1960, Ser. No. 66,216
2 Claims. (Cl. 96—27)

This invention relates to a method and apparatus useful in the making up of printed material. The present application is a division of my co-pending application, Serial No. 776,662, filed November 21, 1958, now Patent No. 2,968,992, which is a continuation-in-part of application Serial No. 428,672 filed May 10, 1954, now abandoned.

In photolithography, a negative of one or more columns of typed or otherwise written material is employed for the photoetching of a printing plate. The present invention is directed to an improved method and apparatus useful in the production of such negatives.

According to the present invention, which is particularly advantageous for production of directories and other listings, the material to be made up is typed or otherwise composed on cards, preferably using a composing machine such as the "VariTyper" typewriter, one line being written on each card. The line of writing is in the same relative position on each card and is very precisely located with respect to a physical feature of the card, e.g., a pre-cut aperture in the card or a hole formed in the card when the line is written thereon. The cards, in regular order, are then photographed in an automatic camera in which a film is progressed past an aperture, successive zones of the film being exposed to successive cards so as to provide a columnar make-up of the line appearing on the cards.

A feature of the machine of the present invention is that the aperture for exposure of the film is adjustable for different-size lines of type while preserving the base line of the type (line of bottoms of most letters) at the axis of the lens to facilitate preparation of the cards. The setting of the aperture, in accordance with another feature of the invention, is preferably such that there is a slight overlap of exposures on the film to avoid the possibility of lines on the negative between exposures caused by very narrow unexposed areas. High-contrast film may be used to avoid the necessity for retouching the negative, the appearance of the double-exposed, overlapped portion between lines of type being not substantially different from the rest of the background.

Operation of the automatic camera and of the card-feeding mechanism is synchronized, preferably being powered from a single motor, to provide for film feed from an unexposed film magazine during the portion of the operating cycle in which a new card is moved into position for photographing.

Among the objects of the present invention are to provide a machine and method of the type described in which the alignment of the lines and the clarity of the type are at least as good as work made up by more conventional methods.

Another object is to provide a method of make-up of listings wherein the listings can easily be modified, and in which the composition from which the list is compiled may easily be stored.

A further object is to provide a machine in which the feed of the negative past the shutter may easily be adjusted to vary the spacing between the lines as required. A specific object of the invention is to eliminate extraneous and undesired markings between the lines of data in a photocomposing machine of the kind set forth hereinabove.

Additional objects are to provide a machine and method of the type described in which one composed line on each card may be made up on the negative; and to generally improve machines of the type described.

Other objects and objects relating to details of manufacture and use will be more apparent from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best mode in which I have contemplated carrying out my invention is illustrated in the accompanying drawings, which form part of this specification, and in which:

FIG. 8 (Sheet 6) is an enlarged fragmentary perspective view of the camera portion of the machine.

The machine of the present invention consists generally of an automatic camera 20, a card-feed mechanism 21, and a drive mechanism, including a motor 22, for operating both the camera and the card-feed mechanism in timed relation. Before proceeding with a description of the machine, there will first be described the method, the cards with which the machine operates, and the negative produced by the machine.

The machine of the present invention is intended primarily for the make-up on a film negative of lists, such as directories, price lists, and the like. It finds its greatest utility in the make-up of lists that are subject to change, in that, to provide for changes, cards may be added, substituted, or withdrawn, each card bearing a single line of type.

Figures 1, 14, 15:
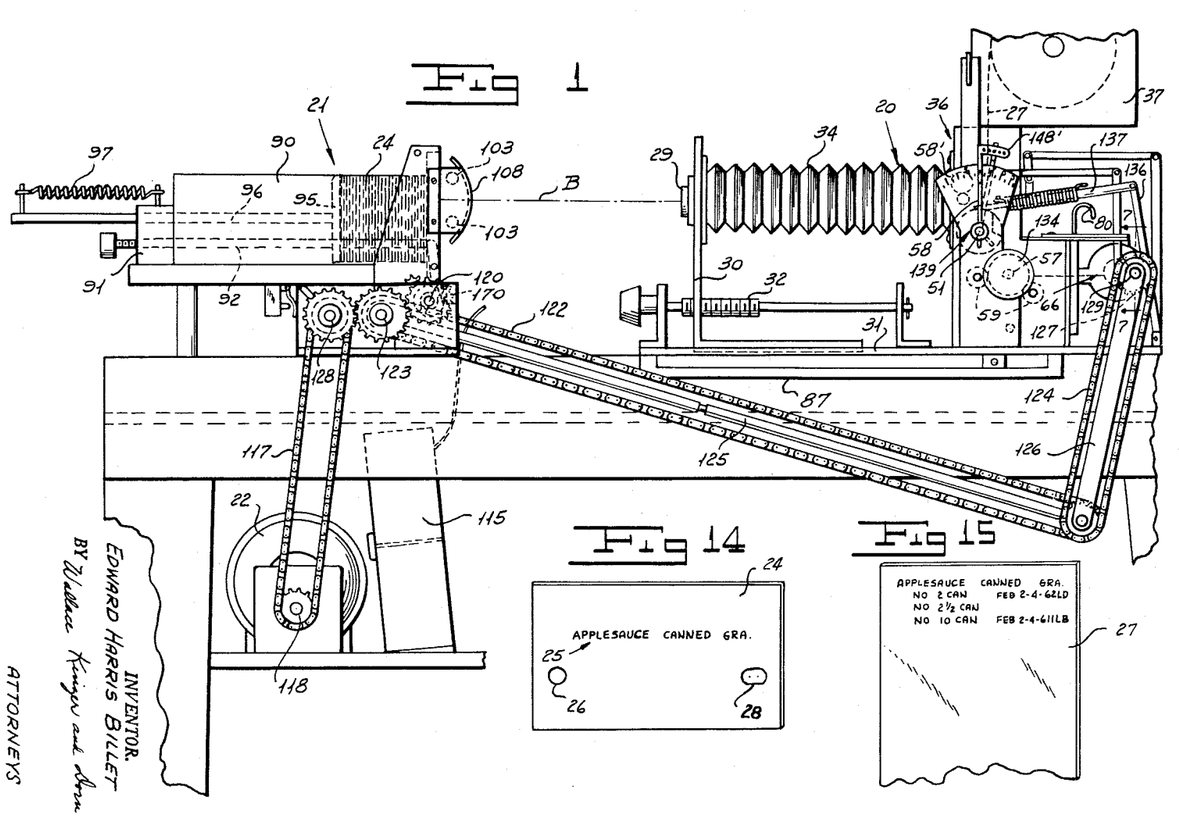
FIG. 1 (Sheet 1) is a somewhat diagrammatic side elevation of the machine of the present invention, portions of the machine being broken away for convenience of illustration.
FIG. 14 (Sheet 1) is a somewhat diagrammatic view of a card for use in the machine of the present invention.
FIG. 15 (Sheet 1) is a more or less diagrammatic view of a negative produced by the machine of the present invention, but shown as a positive for convenience in preparation of the drawing.

The cards for the present machine may be 3" x 5" cards, such as the card 24 shown in FIG. 14. This card has at least one typed line 25 which is spaced very precisely with relation to a physical portion of the card, such as the holes 26 and 28, these holes serving as guides for the card in the machine to be described. The composed line 25 is not only spaced a specific and uniform height above the holes 26 and 28 but is also located very precisely lengthwise of the card so as to maintain substantially perfect columnar alignment in the made-up list, as will be explained. Other card sizes may, of course, be used.

Preferably, the card 24 is written with a composing machine, such as the "VariTyper" typewriter, which will produce a line of type closely approximating printing in appearance and quality in any one of a number of different type styles. The holes 26 and 28 may be punched in the card after the card is inserted into the "VariTyper" typewriter so as to assure a definite and uniform positioning of the composed line with relation to the holes. On the other hand, the holes may be pre-formed in the cards by a die-cutting or other accurate cutting operation, in which case the composing typewriter should be fitted with guide means to engage in the apertures and maintain the requisite precision of location of the composed line with respect to the apertures. The holes are later used in accurately locating the card while it is being photographed.

Preferably, the hole 26 adjacent the left or starting end of the typed line is round to positively locate this portion of the card by means of a pilot pin or rod, as will be explained. The hole 28 preferably is somewhat elongated, having a major dimension aligned with the center of hole 26, with the sides of the aperture parallel to the typed line 25, and having a minor dimension equal to the diameter of the hole 26. In such a construction, minor dimensional changes of the card due to variations in moisture content after punching will not cause the card to stick on the pilot pins or rods, to be described. Moreover, the round hole 26 adjacent the start of the line of type 25 serves to accurately locate this portion of the card 24 for photographing, the elongated hole 28 merely serving to keep the card level.

The negative 27 indicated in FIG. 15 has been exposed and developed; it is shown as a positive for convenience in presentation in the drawing. This negative contains the made-up matter one column in width, the printing appearing as clear or transparent letters on a black background. Each line of printing on the negative is the photographed reproduction of a line from one of the cards 24.

The negative 27 is preferably a high-contrast film in which there is substantially no tendency of the film emulsion to record degrees of variation between light and dark, the photographed material appearing on the film as either black or clear areas. By using such film, a better reproduction of the material typed on the cards is secured and, in addition, the necessity of retouching the negative after developing is eliminated. Further, since the negative 27 is exposed a line at a time, it is desirable that each exposure of the film overlap the next preceding and next following exposure very slightly so as to eliminate any horizontal lines on the negative caused by narrow unexposed areas of film between successive exposures. By the use of high-contrast film, the doubly exposed areas of the film due to overlapping of the individual exposures will not be substantially different in appearance from the areas of the film that have been exposed only once. Also, there will be no lines caused by unexposed areas and requiring elimination by retouching.

The negative 27 may be used directly for the photo-etching of plates for reproducing the made-up material. The negative produced by the machine may be divided into columns of the proper length as desired, or may be set in a single long column and cut as required into separate columns.

The automatic camera 20 comprises an objective lens 29 which is mounted on a suitable frame 30 supported for sliding movement along a track 31. To vary the distance of the lens from the film as required to maintain the film at the focal plane of the lens, a lead screw 32 with vernier adjustment is provided for moving the frame 30 carrying the objective lens. The various settings of the lens for frequently used enlargements and reductions may be indicated by suitable markings along the track 31. A conventional bellows 34 extends between the frame 30 and the body 36 of the camera.

Figure 4:
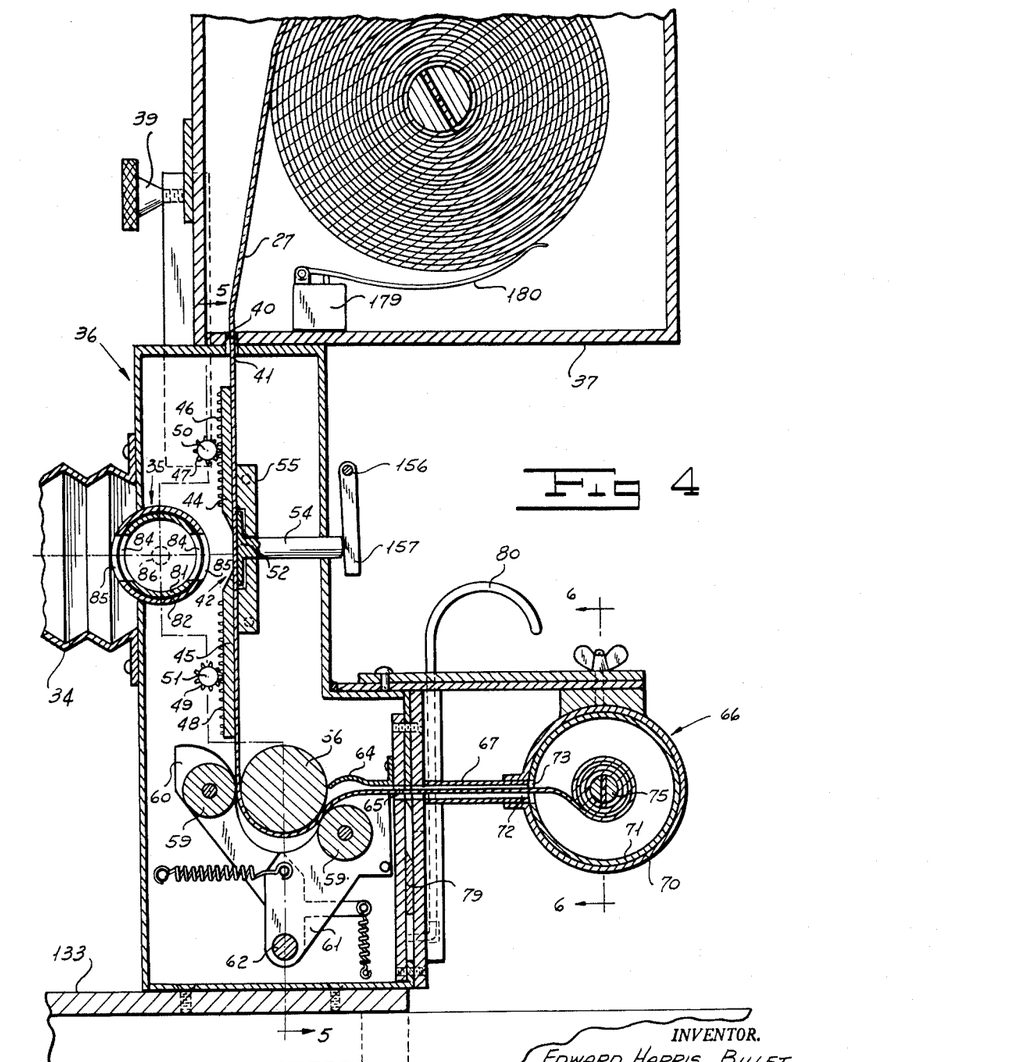
FIG. 4 (Sheet 4) is a vertical section of the camera portion of the machine taken generally on the line 4—4 of FIG. 2.

The body 36 of the camera comprises a light-tight box supporting the shutter 35 and providing for progressive movement of the film 27 through the camera. The unexposed film is contained within a light-tight unexposed-film magazine 37 secured to the top of the box 36 by one or more thumb screws 39. The unexposed film or negative 27 is fed downwardly through registering slots 40 and 41 (FIG. 4) in the magazine 37 and box 36, respectively, and to a film-exposure station 42 (FIG. 4).

At the exposure point 42, a pair of opaque masks 44 and 45 are mounted in a vertical plane immediately in front of the film, the masks 44 and 45 having parallel, horizontally extending, confronting edges. The confronting edges of the masks 44 and 45 are against the film and are at the focal plane of the lens 29. The masks 44 and 45 are vertically adjustable by means of vertically extending racks 46 and 48 on the front of these masks which mesh with pinions 47 and 49 fixed to shafts 50 and 51, respectively, the shafts extending transversely of, and being journalled in, the box 36.

A pressure plate 52 is mounted directly behind the film at the exposure point 42, the pressure plate being supported on a rearwardly projecting stud 54 slidingly received within a support 55 so that forward movement of the pressure plate will press the film tightly against the masking plates 44 and 45 during exposure of the film to absolutely limit the area of film being exposed and maintain the film accurately at the focal plane. Since the film negative 27, while being exposed, rests against the rear face of the masking plates 44 and 45, adjustment of these plates toward or away from each other accurately and precisely controls the area of film exposed at any one time.

Figure 2:
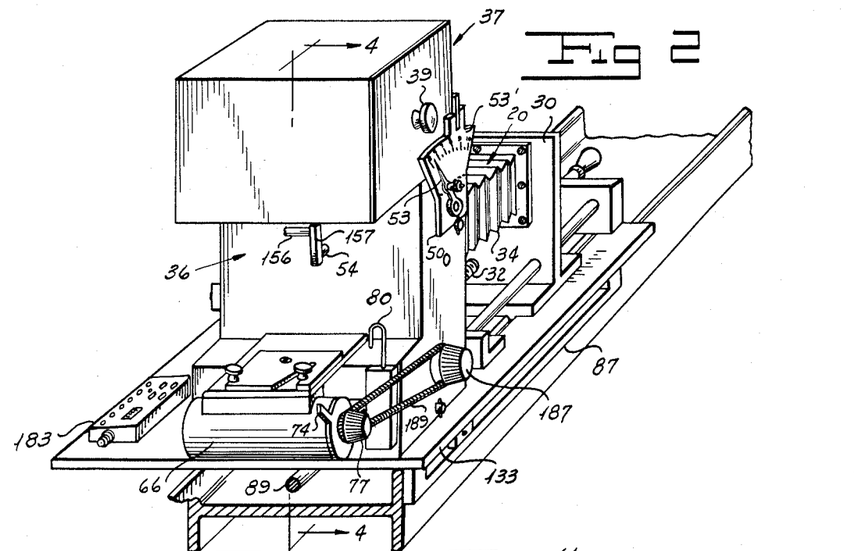
FIG. 2 (Sheet 2) is a perspective view of the camera portion of the machine of FIG. 1.

An arm 53 (FIG. 2) is fixed to the shaft 50 for raising and lowering the mask 44 with respect to the axis of the lens 29. The mask is always positioned at least a very small distance above the lens axis B to provide a slight overlap of each exposure, and is additionally raised to provide for the descending characters (characters that descend below the base line of the type). The arm 53 is adjusted along a quadrant 53', which may be graduated in accordance with the type size being reproduced on the film negative 27. Likewise, an arm 58 (FIG. 1) is fixed to the shaft 51 and is adjustable along a quadrant 58' for adjusting the mask 45 in accordance with the ascenders of the type, the quadrant 58' being graduated according to type size. Since overlap between adjacent exposure areas is provided for in adjustment of the mask 44, it need not be taken into account in adjusting the mask 45.

A film-feed roll 56 (FIG. 4) extends transversely of the box 36, being mounted on a shaft 57 (FIG. 8) projecting from the box to drive the roll. Two idler rolls 59, 59 serve to press the film against the feed roll 56 to prevent slippage of the film on the surface of the feed roll, the idler rolls being rotatively mounted on a pair of cranks or levers 60 and 61 which are journalled on a transversely extending shaft 62 and are biased to press the idler rolls against the feed roll. Preferably, the portions of the levers 60 and 61 confronting the feed roll 56 are shaped as generally indicated in FIG. 4 to aid in guiding the film through the camera; in addition, a film guide 64 may be provided behind the feed roll to guide the film through an exit aperture 65 in the box 36.

Figure 6:
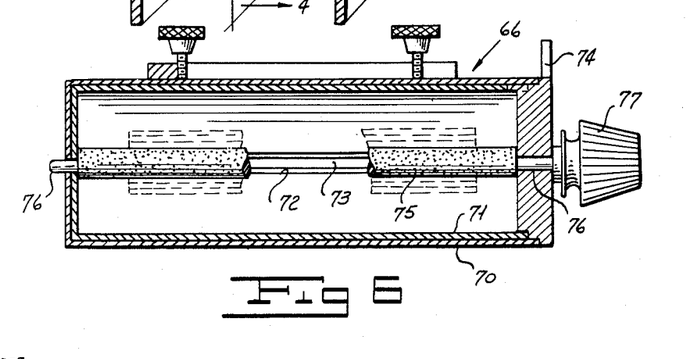
FIG. 6 (Sheet 2) is a vertical section of the exposed film magazine taken generally on the line 6—6 of FIG. 4.

An exposed-film magazine 66, best seen in FIGS. 4 and 6, is removably mounted adjacent the film-exit aperture 65, the exit aperture preferably having an extended mouth 67 and the film magazine having a portion fitting around the mouth of the aperture. Preferably, the film magazine 66 comprises outer and inner cylindrical casings 70 and 71 provided with film slots 72 and 73, respectively, the construction being such that the inner casing 71 may be turned within the outer casing 70 to move the film slots into or out of registry as required. A projecting lug 74 on the inner casing 71 serves to rotate this casing within the outer casing 70.

The exposed-film magazine 66 is provided with a film reel 75 upon which the exposed film is collected, the reel 75 being mounted on a transverse shaft 76 projecting through the housing and provided with a combination knob and pulley 77 for rotating the shaft and reel. Pulley 77 is driven by the spring belt 189 (FIG. 2) entrained over it and over the combination knob and pulley 187 connected to the shaft of film-feeding roll 56.

A film knife 79 is pivotally mounted in the box 36 adjacent the film-exit slot 65, the knife being oscillatable about a mounting pivot pin (not shown) at one end of the knife by a handle 80 connected to the other end of the knife and extending from the box to move the knife across the path of the film through the exit slot so as to cut the film. The knife also serves as a light carrier to prevent film within the camera from being light-struck upon removal of the exposed-film magazine 66.

Figure 5:
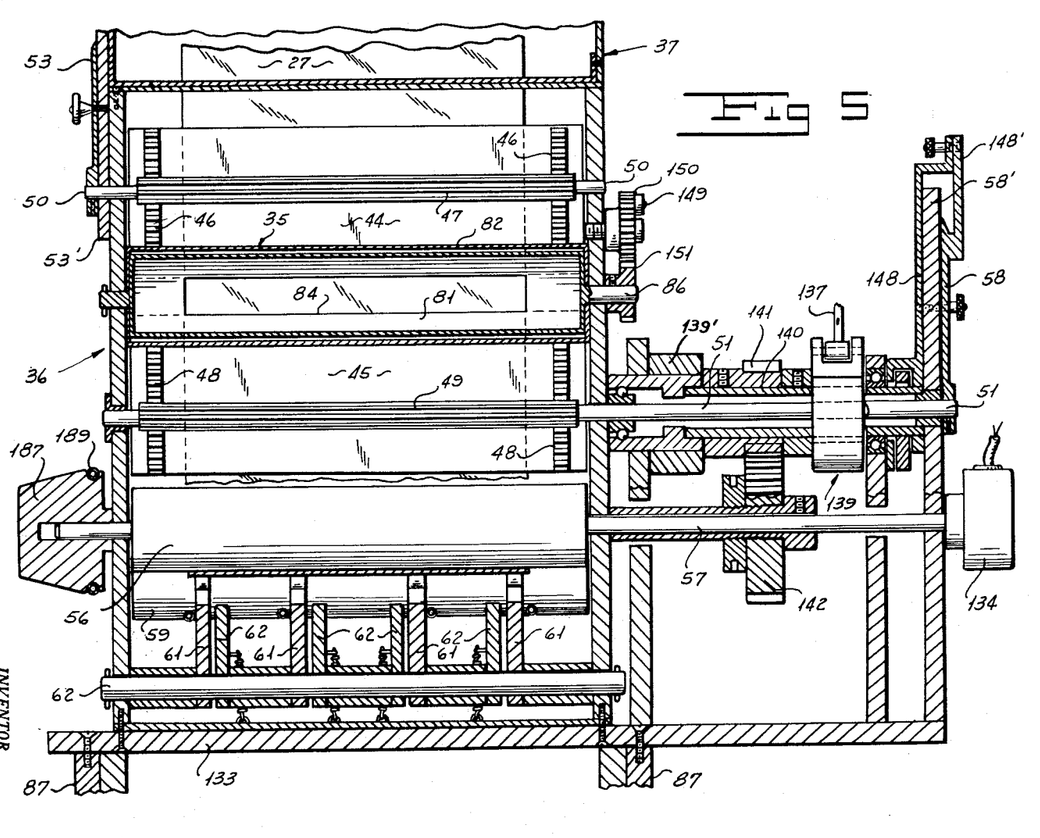
FIG. 5 (Sheet 5) is a transverse vertical section taken generally on the line 5—5 of FIG. 4.

The shutter 35, best seen in FIG. 4, is preferably formed of inner and outer cylindrical casings 81 and 82, the outer casing 82 being fixed in the wall of the box 36 between the objective lens 29 and the film-exposure point 42, and the inner casing 81 being mounted for oscillating movement within the outer casing. Diametrically opposite slots 84, 84 in the inner casing 81 and 85, 85 in the outer casing 82 are in registry when the shutter is open and out of registry when the shutter is closed. The shutter is operated by a shaft 86 (FIG. 5) axially extending from the inner casing, oscillation of the shaft moving the shutter between open and closed positions.

The camera unit 20 is mounted for sliding movement as a unit on guides, one guide 87 being shown, toward and away from the card-feed-and-exhibiting mechanism 21 to determine the amount of reduction or enlargement of the material appearing on the cards. A lead screw 89 (FIG. 3), which is provided with a vernier adjustment, serves to move the camera 20 toward and away from the card-feed-and-exhibiting mechanism 21.

The card-feed-and-exhibiting mechanism 21 consists of a boxlike card container 90 which is rigidly mounted on the frame of the machine. The card container 90 includes a block 91 having a pair of round, straight, horizontally projecting rods 92, 92 mounted therein, the rods being of uniform diameter throughout their length, except for a slightly enlarged terminal diameter 94 at the forward end of the rods. The cards 24 are received within the card container 90, the rods 92, 92 being entered through the holes 26, 28 of the cards so as to support the cards within the container. A card follower 95 is mounted for movement along the rods 92, 92 being pressed forwardly along the rods by a card-follower rod 96 received in the block 91 and biased forwardly by a spring 97.

Forward motion of the cards 24 along the rods 92, 92 is limited by a card-feeder mechanism 99, which includes a frame 100 which is mounted for vertical reciprocating movement within vertical slots formed in stationary guide members 101, 101 which also form the forward support of the card container 90. The frame 100 includes a knife feeder 102 against which the forward card 24 of the stack is pressed by the card follower 95, the knife feeder 102 having a rearwardly projecting lip 104 for engaging the top edge of the foremost card 24 of the stack (see FIGS. 9 and 11). The frame 100 is supported against downward movement due to gravity by a pair of cams 110, 110 (FIGS. 11 and 12).

Figure 9:
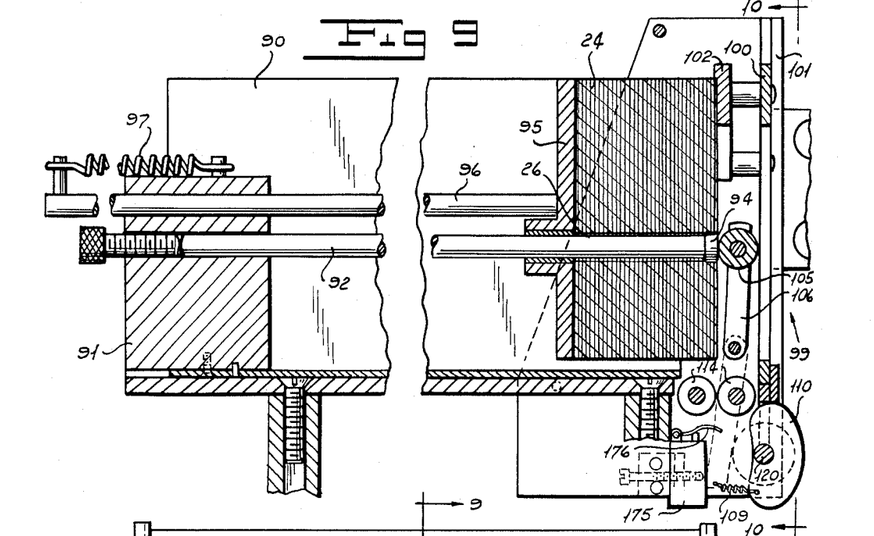
FIG. 9 (Sheet 7) is a vertical section of the card-feed mechanism, taken generally on the line 9—9 of FIG. 10.
Figure 10:
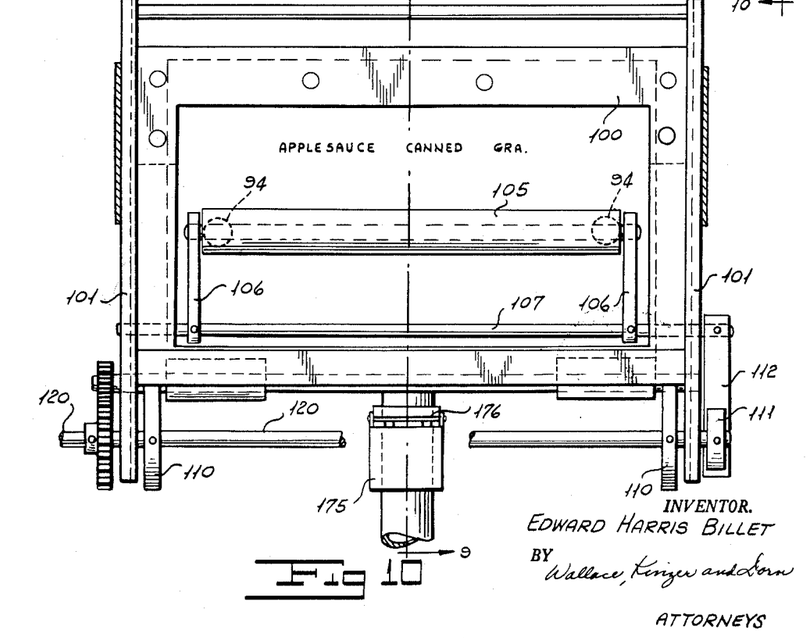
FIG. 10 (Sheet 7) is a front elevation of the card-feed section of the machine, the view being taken from line 10—10 in FIG. 9.
Figure 11:
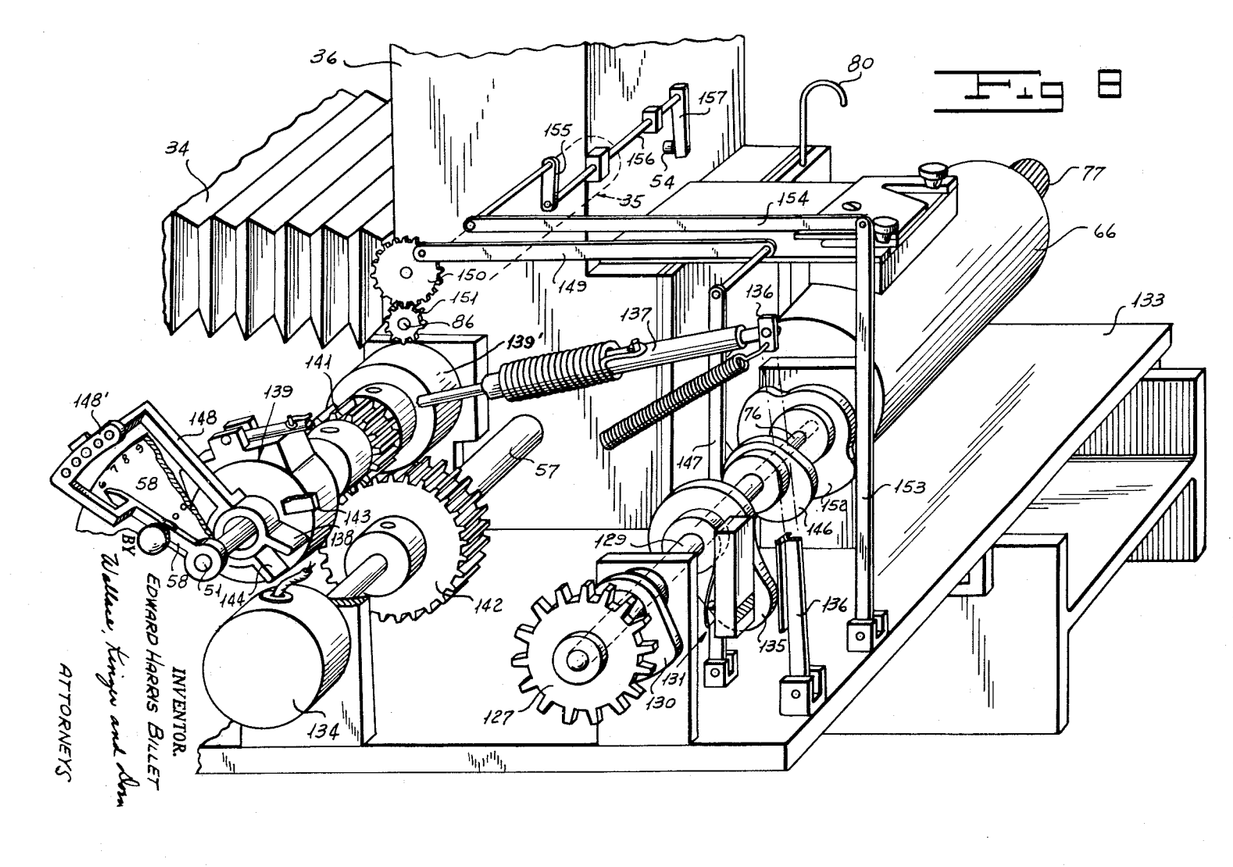
FIG. 11 (Sheet 8) is a detailed fragmentary section of a portion of the card-feed mechanism during the cycle of the machine when a card is being photographed.
Figures 11, 12, 13:
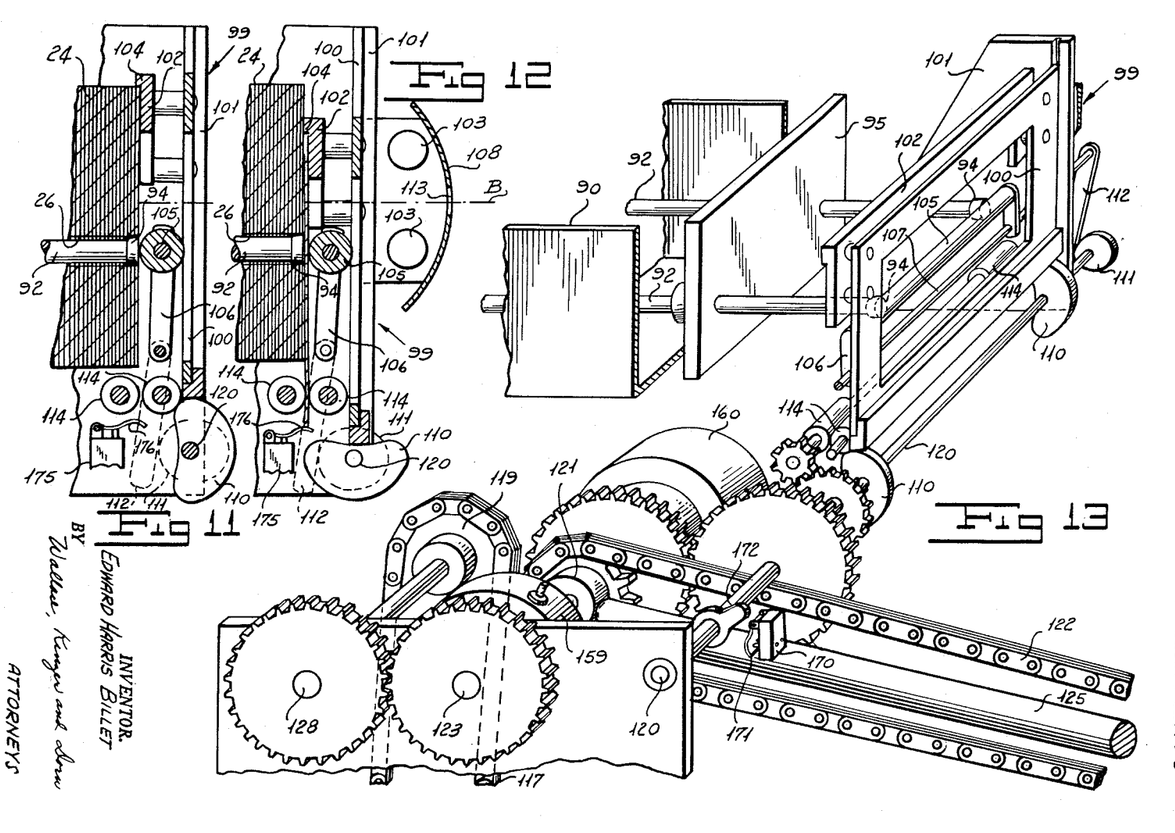
FIG. 12 (Sheet 8) is a view similar to FIG. 11 of the card-feed mechanism during the card-feed operating cycle.
FIG. 13 (Sheet 8) is a fragmentary perspective view of the card-feed mechanism as a whole.

Referring to FIGS. 9, 11, and 13, forward movement of the cards 24 is also limited by a transverse roller 105 which lies more or less against the forward ends of the card guide rods 92, 92 so as to prevent the foremost card from being pressed forwardly from the rods. The roller 105 is journalled on the upper ends of a pair of arms 106, 106 fixed to a cross shaft 107 journalled in the guide members 101. A tension spring 109 (FIG. 9) biases the roller 105 against the forward ends of the rods 92, 92.

The foremost card 24 is illuminated for photographing by a pair of horizontally extending lamps 103, 103, preferably of the fluorescent type and mounted, one above, one below, the line of typing on the card. A reflector 108 is mounted behind the lamps and is provided with a slot 113 opposite the typed line on the card to permit photographing of the typed line.

Figure 3:
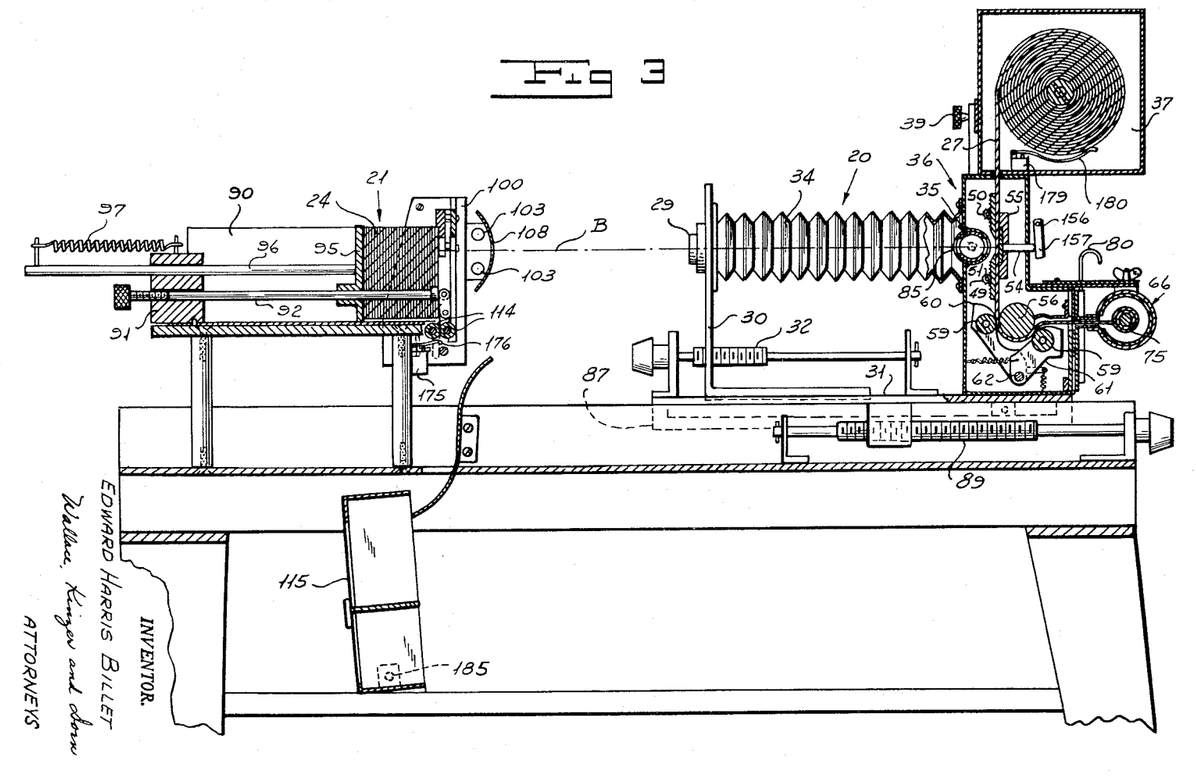
FIG. 3 (Sheet 3) is a somewhat diagrammatic vertical section taken generally along the axis of the camera lens, such lens and a portion of the camera bellows being shown in elevation.

During the time that the camera 20 is actuated to photograph the writing on the foremost card 24, the card is precisely held in a definite display position or station by the rods 92, 92, the knife feeder 102, and the transverse roller 105, as indicated in FIG. 11. After the foremost card 24 has been photographed, the frame 100, which carries the knife feeder 102 and rides on the cams 110, 110, drops of its own weight upon rotation of the cams, so as to move the front card 24 downwardly as generally indicated in FIG. 12. At the same time, an eccentric or cam 111 (FIG. 13) presses against a lever 112 to oscillate the cross shaft 107 and move the transverse roller 105 forwardly away from the forward ends of the rods 92, 92 a distance equal to the thickness of a single card to permit the card follower 95 to press the front or foremost card 24 off the rods 92, 92 and the knife feeder to press the card downwardly. Upon downward movement of the card, the lower edge of the card is engaged between the nip of a pair of card-feed rolls 114 which rotate on fixed axes a short distance below the card photographing position and which feed the card downwardly to a card bin 115 (FIG. 3).

As soon as the front card 24 has been extracted as above described, the transverse roller 105 is returned to engagement with the forward ends of the rods 92, 92 and the knife feeder 102 is moved upwardly to the initial position shown in FIG. 11 in which the lip 104 rides up over the top edge of the next card in the stack.

The entire apparatus is preferably driven from a single electric motor 22 (FIG. 1) through a chain-and-sprocket or other suitable drive to maintain the various parts in step in timed relation. A driving chain 117 driven by a sprocket 118 journalled on the motor support rotates a sprocket 119 (FIG. 13) on a shaft 128 which, through a train of gears and an interposed driving shaft 123, rotates a shaft 120 upon which the knife-feeder-actuating cams 110, 110 and the roller-actuating cam 111 are fixed. The shaft 120, also driving through a train of gears, continually rotates the card-feed rollers 114.

The motor 22, by means of chain 117, sprocket 119, and the gears shown in FIG. 13, also drives a sprocket 121. From sprocket 121 the drive continues through chains 122 and 124, supported on a frame consisting of the links 125 and 126, to a sprocket 127 on the camera 20. The driving mechanism and linkage provide for movement of the camera as a whole toward or away from the card holding and feed mechanism 21 without disturbing the operating relation between the shaft 120 of the card feeding mechanism and the shaft 129 of the camera mechanism, these shafts being driven at the same rotative speed.

Figure 7:
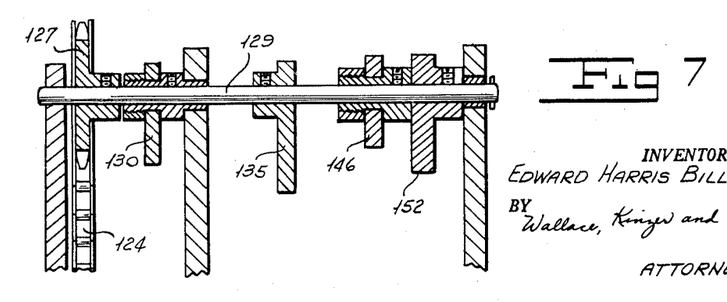
FIG. 7 (Sheet 2) is a more or less diagrammatic vertical section of the operating cams.

Referring now to FIGS. 7 and 8, the shaft 129 has mounted thereon a series of cams for operating the camera 20 in timed relation with the card-feed mechanism 21. Referring to FIG. 7, a clutch cam 130 mounted thereon actuates a sensing switch 131 so as to energize an electric circuit 132 (see FIG. 16) and actuate an electromagnetic brake 134, which is mounted at the outer end of the film-feed-roll shaft 57 (FIG. 8), the purpose of this brake being to prevent further possible incremental progression of the film-feed-roll shaft 57, as will be explained.

A film-feed cam 135, also mounted on the shaft 129, oscillates a lever 136 having one end pivotally mounted on the base 133 of the camera 20. A tensionally yieldable drag link 137, pivotally connected to the top of lever 136, is connected with a ratchet 139 of the "sprag clutch" type for radially rotating a tubular shaft 140 (FIG. 5) journalled in the side of the camera box 36 in coaxial encompassing relation with shaft 51. Rotation of the shaft 140 rotates a gear 141 mounted thereon, and thus drives a meshing gear 142 mounted on the film-feed-roll shaft 57 and serves to rotate the shaft 57 upon each actuation of the lever 136 by the cam 135.

Attached to the side of the ratchet 139 is a dog 138, which is movable therewith. Rotation of the ratchet 139 is limited by a fixed stop 143 and by a movable stop 144 between which the dog 138 oscillates, the stop 143 limiting retrograde movement of the dog and thus of the ratchet and the stop 144 limiting forward movement of the ratchet. The stops, together, serve to determine the degree of rotation of the shaft 140 after each exposure. The movable stop 144 is mounted for rotation on the axis of the shaft 140 and is settable by means of an integral arm 148. The construction of the cam 135 and lever 136 is such that the drag link 137 will have sufficient longitudinal movement for the maximum drive of the shaft 140 at any time, the drag link 137 being made in two telescoping pieces connected by a spring 145 to provide a drag link that will yield for less than maximum film progression.

A stationary ratchet 139', which may also be of the "sprag clutch" type, serves to prevent any reverse movement of the shaft 140 upon return movement of the ratchet 139 and its associated mechanism. In addition, the brake 134 prevents possible incremental forward movement of the shaft 57 due to "bounce" of the ratchet 139 and its associated parts when it is returned against the fixed stop 143 after film progression has taken place. Summarizing, the ratchet 139 causes film progression, and the ratchet 139' and brake 134 prevent reverse movement and accidental forward movement, respectively.

The film-feed adjustment arm 148, the bottom end of which forms a movable stop 144, is adjustable along a quadrant 148', which is preferably integral with the mask-adjusting arm 58, so that adjustment of the mask for the ascenders of a given type style (the lower mask 45 due to inversion by the lens) will automatically adjust the film feed according to the setting of that mask. The arm 148 is adjustable along the quadrant 148' to provide for additional film movement according to the setting of the mask 44, the quadrant 148' being graduated for that purpose.

A shutter cam 146 is also fixed to the shaft 129, the shutter cam operating through a lever 147 pivotally mounted on the camera base 133 and a drag link 149 to oscillate a shutter-operating gear 150 meshing with a second shutter-operating gear 151 fixed to the shutter operating shaft 86. Oscillation of the lever 147 in one direction opens the shutter by aligning the slots 84 and 85 (FIG. 4) in the shutter-forming cylinders, and oscillation in the other direction closes the shutter.

A pressure-plate-operating cam 152 also fixed to the shaft 129 operates a lever 153 likewise pivotally mounted on the camera base 133 and operating through a drag link 154, lever 155, shaft 156, and lever 157, to press the stud 54 (FIG. 4) of the pressure plate inwardly so as to press the film against the opaque plates 44 and 45 to mask the film during exposure.

Figure 16:
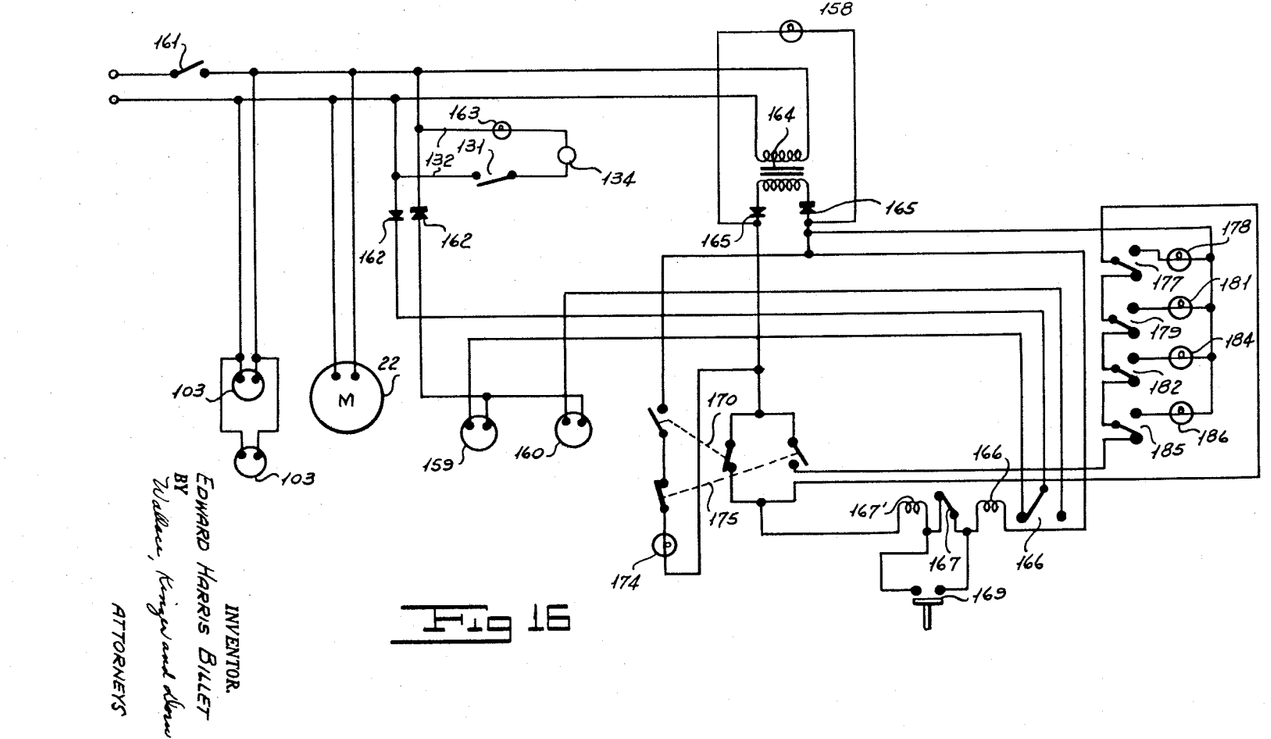
FIG. 16 (Sheet 9) is a wiring diagram of the machine.
Figure 17:
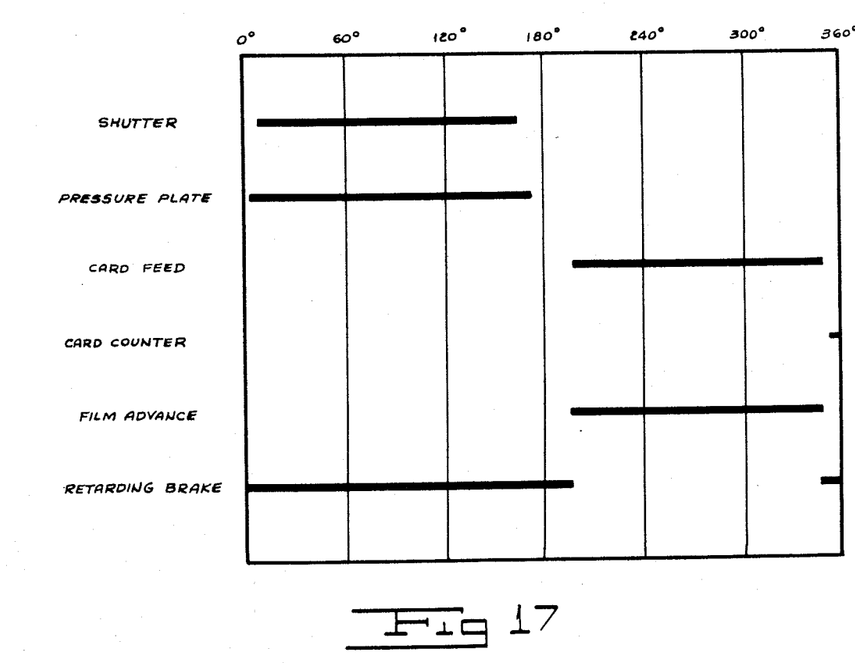
FIG. 17 (Sheet 10) is a diagram indicating the timed relation between various operating portions and devices in the machine.

Operation of the various cams on shaft 129 is indicated graphically in FIG. 17, the machine being arranged such that, during the time that a card 24 is in position for photographing, the pressure plate 52 presses the film against the opaque masks 44 and 45 and the shutter is opened to make the exposure, after which the front card 24 is withdrawn from the stack, the pressure plate 52 moves rearwardly to release the film, and the ratchet 139 progresses the film for the next exposure; after which the cycle is repeated. The brake 134 is energized at all times except when the film-feed shaft 57 is being rotated forwardly by the ratchet 139 so as to avoid unintentional movement of the film-feed shaft, particularly during the time of retrograde movement of the ratchet. An indicator light 163 (FIG. 16) in series with the brake 134 is lit whenever the brake 134 is energized.

The machine of the present invention is provided with a series of electrical controls to assure that the machine will be stopped immediately in the event of malfunctioning of the machine, exhaustion of the supply of cards 24 to be photographed, or exhaustion of the supply of unexposed film in the magazine 37. Moreover, the machine is always stopped at the end of its operating cycle, at which time the shutter is closed, and without passing through an additional operating cycle, so as to avoid spoiling the negative by either being struck by light or by blank, omitted, or repeated lines.

Operation of the machine is controlled by a magnetic clutch 159 and a magnetic brake 160, the clutch and brake being located on the shaft 123 (FIG. 13). The action of the clutch 159 and brake 160 is such that the clutch is normally energized during operation of the machine. However, upon malfunctioning of the machine or exhaustion of cards 24 or of unexposed film 27, the clutch is immediately de-energized to disconnect the driving mechanism, and the brake 160 is immediately energized to stop the machine rather than permitting it to go through another cycle or portion of a cycle of operation. The clutch 159 and brake 160 are controlled by electrical circuits, as will be explained.

The wiring diagram for the machine is shown in FIG. 16. The machine is adapted for operation by 110 v.– 120 v., 60 cycle alternating current, although any other suitable power supply may be used if desired, and is provided with a manually operated, single-pole, single-throw, main switch 161. Closing of the switch 161 energizes the card lights 103, 103 which are connected in parallel, and also energizes the driving motor 22.

A transformer 164, in parallel with the lights 103, 103 and the motor 22, is operated by the 110 v. current source and serves to step the voltage down to 25 volts on the secondary side of the transformer, the 25 v. circuit being rectified and to afford a D.C. supply for energizing the controls for the clutch 159 and the brake 160 as described hereinafter. The magnetic clutch 159 and magnetic brake 160 are alternatively energized through a single-pole, double-throw switch 166, the clutch and brake preferably operating on 90 v. direct current provided by a pair of selenium rectifiers 162, 162.

The circuit coming from the secondary side of the transformers 164 is provided with a pair of selenium rectifiers 165, 165 for developing a 24 v. D.C. supply in order to provide for positive, trouble-free operation of the relay switches to be described. An indicator light 158 is illuminated upon closing the main switch 161 to show energizing of the circuit through the rectifiers 165, 165.

The control for clutch 159 and brake 160 includes the single-pole, double-throw, relay switch 166, which is spring-biased to complete the electrical circuit through the brake 160 and which, during operation of the machine, is held against its bias to complete a circuit through the clutch 159 by energizing of the relay coil. Upon opening of the circuit through the relay switch 166, the switch immediately interrupts the circuit to the clutch 159 and completes the circuit to the brake 160 so as to stop the machine substantially instantly.

A single-pole, single-throw, relay switch 167 is connected in series with the coil 166' of the relay switch 166, the relay switch 167 being spring-biased to open position and being held in closed position during operation of the machine by the coil 167' of the relay 167. A single-pole, single-throw switch 169 of the push-button type is connected in parallel with the relay switch 167 and in series with the coil 167' of that relay, the switch 169 serving as a reset switch. This switch must be pressed for a short interval of time to commence or resume operation of the machine, operation of the machine then continuing until such time as the circuit to the relay switch 167 is interrupted, in turn opening the circuit to the coil 166' of the relay switch 166 which releases relay switch 166 to energize the brake 160 rather than the clutch 159.

The relay coil 166' and the relay coil 167' are connected in series with the secondary side of the transformer 164. This circuit includes a pair of double-pole, single-throw sensing switches, one pole of each switch being normally open and the other pole of each switch being normally closed. One such switch 170 is mounted adjacent the knife-feeder-operating shaft 120 (see FIG. 13) and has an actuator 171 which is actuated by cam 172 fixed to the shaft 120 so as to operate the switch once during each cycle of the machine. The pole of the switch 170 that is normally closed is in the direct circuit to the relay coil 167', and the pole of this switch that is normally open is in circuit with an indicator light 174 (see FIG. 16).

The second double-pole, single-throw sensing switch 175 is mounted just below the card container 90 (see FIGS. 9–12) and has an actuator 176 located in the path of a photographed card being fed downwardly by the card-feed rollers 114, 114. This switch has a normally open pole connected in a second circuit with the relay coil 167', the pole being connected to the normally closed pole of the switch 170. The normally closed pole of the switch 175 is in series with the normally open pole of the switch 170.

Four single-pole, double-throw switches are connected in series with each other in the circuit between the normally open pole of the switch 175 and the relay coil 167'. One of these switches, the switch 177, is a manually controlled switch and serves to start and stop operation of the machine without, however, stopping the motor 22 or extinguishing the lights 103, 103. However, closing of this switch does not institute operation of the machine until the reset switch 169 is pressed. An indicator light 178 is illuminated when this switch is operated to open the circuit to the relay coil 167'. The other three switches are preferably relatively sensitive sensing or limit switches, one switch 179 being located in the unexposed-film magazine 37 (see FIG. 4) and having an actuator 180 which operates the switch upon exhaustion of the unexposed film 27 so as to open the circuit to the relay coil 167'. Upon switch 179 being thrown, an indicator light 181 is illuminated.

A sensing switch 182 is operated by the full count of a mechanically actuated subtractive counter 183 (FIG. 2) so as to likewise interrupt the circuit to the relay coil 167' upon operation of the machine through a number of cycles equal to the number for which the counter 183 was set. When this switch is thrown, it illuminates an indicator light 184.

A limit switch 185, likewise in circuit with the relay coil 167', is mounted beside the photographed-card bin 115 (FIG. 3) and serves to open the circuit to the relay coil 167' at any time when the card bin is not in position to receive the photographed cards. An indicator light 186, connected with the other throw of this switch, is illuminated upon operation of this switch.

The timed relation of the various portions of the machine is such that, in normal operation of the machine, the switch 175 operated by the cards coming from the feed rolls 114, 114 is actuated to close the pole of the switch in the holding circuit to the relay coil 167' during all of the time that the cam-actuated switch 170 (FIG. 13) is actuated so as to open the direct circuit to the relay coil 167'. However, upon failure of the machine to feed a card downwardly, the switch 175 will not be actuated, and, therefore, when the cam-operated switch 170 is operated, the relay coil 167' will be de-energized, and the machine will immediately stop, the light 174 being illuminated to indicate the cause of the stoppage. The cam 172 (FIG. 13) is so positioned and shaped as to stop the machine at a predetermined point in the operating cycle of the machine in which the shutter is closed and in which the film has been completely progressed since the last exposure. This position in the operating cycle of the machine is preferably the zero-degree line of FIG. 17.

Even though a card is properly fed so that the switch 185 is actuated, actuation of any of the switches 177, 179, 182, and 195 will likewise cause the machine to be stopped when the switch 170 is actuated by the cam 172. At the same time, the indicator light connected with the particular switch that has been actuated to open the circuit to the relay coil 167' will be illuminated to indicate the cause of the stoppage.

In operating the machine, a stack of cards 24 is placed within the card container 90, and film is inserted in the automatic camera 29 if no film is in the camera. If it is desired to have a separate film for each column, the counter 183 is set for the number of lines in a column; otherwise, a continuous column may be composed, which may be subsequently cut to the length desired.

The switch 161 having been closed, operation of the machine is instituted by pressing the switch 169 momentarily to energize the relay coil 167' and close the relay switch 167, after which time the machine will continue to operate until the cards are exhausted from the card container 90, or until the counter 183 has returned to zero, or until the machine has been stopped due to exhaustion of film or malfunctioning of the machine in some respect.

The exposed film is accumulated within the exposed-film magazine 66 (FIG. 4) and, upon completion of operation of the machine, the film is turned through sufficiently so that all exposed film will be passed into the magazine 66. The film is then cut by operating the film knife 79, which also serves to prevent entrance of light into the camera 20. The exposed-film magazine 66 is closed before removing it from the camera and is opened in a darkroom, the film then being developed in a customary manner. The developed film is a negative in which the printing of the cards appears in columnar form having the alignment and quality of conventional printed matter. The film is used in the usual manner for photolithography.

In the event of malfunctioning of the machine, the machine will be stopped immediately and in the same operating cycle in which the malfunctioning occurred, so that the cause of the difficulty can be corrected and the machine be restarted without leaving blank, repeated, or skipped lines in the composed matter and thus destroying the usefulness of the composed body.

Hence, while I have illustrated and described the preferred embodiments of my invention, it is to be understood that this is capable of variation and modification, and I therefore do not wish to be limited to the precise details set forth, but desire to avail myself of such changes and alterations as fall within the purview of the following claims.

I claim:

1. A method of making up non-continuous printed matter in columnar form comprising: printing the successive lines of data for the column on individual light-reflecting cards; focusing bands of light containing lines of printed data and an area of non-printed background upon successive transverse exposure areas of a strip of photosensitive film; adjusting a mask for the film in accordance with the size of data to define a background area along the top and bottom edges of the line of data;

and advancing the film a distance less than the height of an exposure area and overlapping the background area from a succeeding exposure area over the background area for the prior exposed line of data, while keeping the lines of data separated from one another, so that markings are prevented between successive exposure areas in the exposed film.

2. The method of making up non-continuous printed matter in columnar form from a multiplicity of individual light-reflecting cards each bearing a line of data for the column in a predetermined data area extending across the upper portion of the card, each card having a pair of registration apertures located adjacent the lower right and left hand corners, respectively, of the card in predetermined spaced relation to each other and to the left-hand margin of said data area, said method comprising: advancing said cards one-by-one, in predetermined order, into an exposure station; individually orienting said cards in said exposure station by engaging a pair of registration members in the registration apertures of said card to align said card with the data area thereof in preselected fixed position in the exposure station; focusing a band of light containing the line of data and an unprinted background portion of said data area, from each card, upon successive transverse exposure areas of a strip of photosensitive film at an exposure station; adjusting a mask for the film in accordance with the size of the data to define upper and lower limits of the background portion along the top and bottom edges of the line of data; and advancing the film, step-by-step in co-ordination with advancement of the cards to said exposure station, by a distance less than the height of an exposure area to overlap the background area from each successive exposure area over the background area of the prior exposed line of data, while keeping the lines of data separated from one another, so that markings between successive exposure areas in the exposed film are prevented.

References Cited in the file of this patent

UNITED STATES PATENTS

| | | |
|---|---|---|
| 2,357,674 | McConnell et al. | Sept. 5, 1944 |
| 2,494,599 | Weckbaugh et al. | Jan. 17, 1950 |
| 2,698,562 | Freund | Jan. 4, 1955 |
| 2,968,992 | Billet | Jan. 24, 1961 |